(12) United States Patent
Bachia et al.

(10) Patent No.: US 10,803,536 B1
(45) Date of Patent: Oct. 13, 2020

(54) PROPERTY HUNTING TRIP IN AN AUTONOMOUS VEHICLE

(71) Applicant: Wells Fargo Bank, N.A., San Francisco, CA (US)

(72) Inventors: George Muthui Bachia, Helena, AL (US); Daniel Jerome Clifford, Minneapolis, MN (US); H. Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 449 days.

(21) Appl. No.: 15/621,318

(22) Filed: Jun. 13, 2017

(51) Int. Cl.
*G06Q 50/16* (2012.01)
*G06N 3/00* (2006.01)
*G01C 21/34* (2006.01)

(52) U.S. Cl.
CPC ........... *G06Q 50/16* (2013.01); *G01C 21/343* (2013.01); *G06N 3/006* (2013.01)

(58) Field of Classification Search
CPC .... G06Q 50/16; G06Q 50/163; G06Q 50/165; G06Q 50/167; G06Q 50/30; G01C 21/343; B60K 2370/175; B60K 2370/16; G05D 2201/0212; G05D 2201/0207; B63B 2035/007
USPC .............. 705/23, 25, 26, 313, 314, 315, 316
See application file for complete search history.

(56) References Cited

U.S. PATENT DOCUMENTS

| | | | |
|---|---|---|---|
| 5,559,707 A | 9/1996 | Delorme et al. | |
| 9,383,749 B2 | 7/2016 | Prada Gomez et al. | |
| 9,517,771 B2 | 12/2016 | Allard et al. | |
| 9,547,309 B2 | 1/2017 | Ross et al. | |
| 9,547,311 B2 | 1/2017 | Tamir et al. | |
| 9,715,233 B1 * | 7/2017 | Mandeville-Clarke ...................... H04L 67/20 | |
| 10,082,793 B1 * | 9/2018 | Glaser ................ G01C 21/3423 | |
| 2003/0109266 A1 | 6/2003 | Ratiah et al. | |
| 2007/0156758 A1 | 7/2007 | Adiga | |
| 2008/0027591 A1 | 1/2008 | Lenser et al. | |
| 2012/0188100 A1 | 7/2012 | Min et al. | |
| 2013/0024060 A1 | 1/2013 | Sukkarie et al. | |

(Continued)

FOREIGN PATENT DOCUMENTS

| | | |
|---|---|---|
| WO | 2008036805 A1 | 3/2008 |
| WO | 2014139821 A1 | 9/2014 |
| WO | 2015134376 A1 | 9/2015 |

OTHER PUBLICATIONS

O'Brien, "How Self-Driving Cars Are Changing up the Game in the Real Estate Industry," O'Brien Real Estate, http://www.obrienrealestate.com.au/self-driving-cars-changing-game-real-estate-industry/, 2016, 2 pages (Year: 2016).*

(Continued)

*Primary Examiner* — Gerardo Araque, Jr.
(74) *Attorney, Agent, or Firm* — Merchant & Gould P.C.

(57) ABSTRACT

A method implemented in an autonomous vehicle (AV) for facilitating property hunting includes receiving a first command to direct the AV to a geolocation of an individual. An itinerary is received for a property hunting trip for the individual in a geographical area. The itinerary includes a plurality of properties. After the individual enters the AV, a second command is received from the individual to direct the AV to a geolocation of a first property on the itinerary. Feedback is received from the individual regarding the first property. An adjustment to the itinerary based on the feedback is received.

20 Claims, 7 Drawing Sheets

(56) References Cited

U.S. PATENT DOCUMENTS

| | | |
|---|---|---|
| 2014/0142785 A1 | 5/2014 | Fuentes et al. |
| 2014/0172727 A1 | 6/2014 | Abhyanker et al. |
| 2015/0112526 A1 | 4/2015 | Martin et al. |
| 2016/0035224 A1 | 2/2016 | Yang et al. |
| 2016/0125735 A1 | 5/2016 | Tuukkanen |
| 2016/0358479 A1 | 12/2016 | Riedelsheimer et al. |
| 2017/0176195 A1* | 6/2017 | Rajagopalan ...... G01C 21/3415 |
| 2017/0249847 A1* | 8/2017 | Marueli ................ G08G 1/202 |

OTHER PUBLICATIONS

B. Pietras, "New frontiers in driverless vehicles," in Engineering & Technology, vol. 10, No. 3, pp. 64-67, Apr. 2015. (Year: 2015).*

William J. Mitchell; Chris E Borroni-Bird; Lawrence D Burns, "Reinventing the Automobile for Urban Use," in Reinventing the Automobile: Personal Urban Mobility for the 21st Century , , MITP, 2010, pp. 52-83 (Year: 2010).*

Jewstar, "Tech Trends That'll Change Showings," http://blog.newstarrealty.com/index.php/2016/04/21/tech-trends-hatll-change-showings/, Newstar Realty & Inv., Apr. 21, 2016, 60 pages (Year: 2016).*

Eisenstein, "New Fleet Lets You Focus on Clients in the Car," http://realtormag.realtor.org/technology/feature/article/2016/11/new-fleet-lets-you-focus-clients-in-car. Realtor Mag, Nov. 2016, 3 pages. (Year: 2016).*

Davies, "We Take a Ride in the Self-Driving Uber Now Roaming Pittsburgh," https://www.wired.com/2016/09/self-driving-aotonomous-uber-pittsburgh/, Sep. 14, 2016, 4 pages.

* cited by examiner

400

10:00 – AV picks up customer at airport

10:30 – Customer views house 1

11:15 - Customer views house 2

12:00 – Customer meets with realtor

12:30 - Lunch

1:30 - Customer views local elementary school

2:00 - Customer views local high school

2:30- Customer views parks, churches and shopping

3:15 – Customer views house 3

4:00 – Customer views house 4

5:30 – AV returns customer to airport

FIG. 4

PROPERTY HUNTING TRIP IN AN AUTONOMOUS VEHICLE

BACKGROUND

An autonomous vehicle is a self-driving vehicle that can operate with little or no human control of the vehicle. A variety of techniques can be used to detect the surroundings of and navigate the autonomous vehicle. Techniques used to detect the surroundings of the autonomous vehicle can include radar, global positioning system (GPS) and computer vision. Advanced control systems can be used to interpret sensory data and to help navigate the autonomous vehicle.

SUMMARY

Embodiments of the disclosure are directed to a method implemented in an autonomous vehicle (AV) for facilitating property hunting using the AV, comprising: receiving a first command to direct the AV to a geolocation of an individual; receiving an itinerary for a property hunting trip for the individual in a geographical area, the itinerary including a plurality of properties; after the individual enters the AV, receive a second command from the individual to direct the AV to a geolocation of a first property on the itinerary; receiving feedback from the individual regarding the first property; and receiving an adjustment to the itinerary based on the feedback.

In another aspect, a method for using an AV for facilitating house hunting using the AV comprises: directing the AV to a geolocation of an individual; receiving an itinerary for a house hunting trip for the individual; displaying the itinerary on a window of the AV; after the individual enters the AV, receiving a command to direct the AV to a geolocation of a first house on the itinerary; after the AV arrives at the geolocation of the first house, receiving an indication of a change in preferences regarding houses to be viewed during the house hunting trip; and based on the change in preferences, displaying an updated itinerary on the window of the AV.

In yet another aspect, an electronic computing device implemented in an AV comprises: a processing unit; and system memory, the system memory including instructions which, when executed by the processing unit, cause the electronic computing device to: direct the AV to a geolocation of an individual; receive from a server computer an itinerary for a house hunting day trip for the individual; display the itinerary on a window of the AV; receive a command from the individual to direct the AV to a geolocation of a first house on the itinerary; display on the window of the AV financial information regarding the first house, the financial information including an asking price for the first house, current property taxes for the first house and an estimated monthly mortgage payment for the individual for the first house; receive one or more comments from the individual regarding the first house; send the one or more comments to the server computer; based on the one or more comments, receive from the server computer an updated itinerary for the house hunting day trip, the updated itinerary including at least one least one house in a different price range than the first house or at least one house in a different neighborhood than the first house; display the updated itinerary on the window of the AV; receive a command from the individual to direct the AV to a second house included in the updated itinerary; and direct the AV to a geolocation of the second house.

The details of one or more techniques are set forth in the accompanying drawings and the description below. Other features, objects, and advantages of these techniques will be apparent from the description, drawings, and claims.

DESCRIPTION OF THE DRAWINGS

FIG. 4 shows an example trip itinerary.

DETAILED DESCRIPTION

Figure 1:
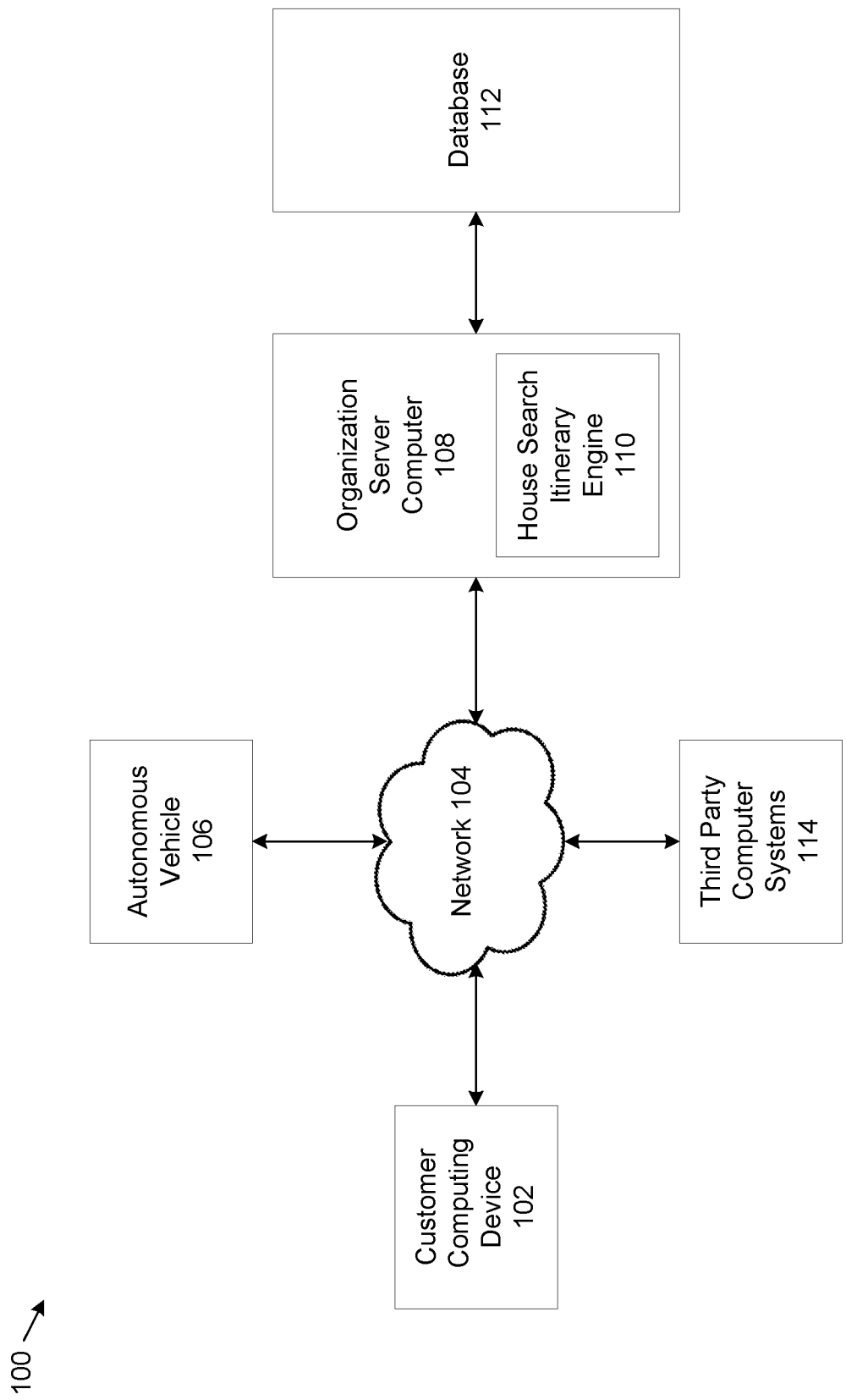
FIG. 1 shows an example system that supports house hunting in an autonomous vehicle.

The present disclosure is directed to systems and methods for developing an itinerary for a property hunting trip using an autonomous vehicle (AV). Using the systems and methods, an individual can plan a trip to a city or neighborhood to search for a property. As used in this disclosure, the property can comprise a piece of land without any existing structures on the land or the property can comprise the piece of land with an existing structure, such as a house or a commercial building. In the present disclosure, property hunting is described as house hunting and the property hunting trip is described as a house hunting day trip. However, the systems and methods can also be used for a property hunting trip that does not include a house.

In the examples described herein, based on a financial profile of the individual and housing preferences of the individual, an itinerary for the house hunting day trip can be planned in advance. The itinerary can include one or more houses that the individual can view and one or more points of interest related to the neighborhood in which the houses are located. Example points of interest can include schools, churches, parks, shopping areas, downtown areas and local sites. Other points of interest are possible.

An optimal route can be created for the houses and points of interest in the itinerary. The individual can identify and use a professional service agent, such as a realtor, legal advisor or financial services agent to help plan the trip, the itinerary and the optimal route.

In an example implementation, the itinerary for the house hunting day trip can be created for the individual. An AV can be directed to pick up the individual at the airport of the locality for house hunting trip. The AV can then be directed to drive the individual to a first house on the itinerary. The professional service agent can arrange to pre-qualify one or more of the houses on the itinerary for purchase by the individual. The itinerary, including the one or more houses for which the individual is prequalified to purchase can be displayed on a display device on the AV. In some implementations, the display device can be one or more windows of the AV.

As the AV drives the individual to the first house, information regarding the first house and regarding houses along a route to the first house can be displayed to the individual in the AV. The information can be displayed on one or more windows of the AV, including a windshield of the AV, or another display device if windows in the AV are not being used. The information can include a current market value of the houses along the route, a current market value of the first house, a current asking price for the first house, property tax and utility costs for the first house and mortgage information for the individual for the first house. The mortgage information can include an estimated monthly mortgage payment amount for the individual. The estimated monthly mortgage payment amount can be based on an estimated purchase price for the house, an estimated down-payment amount and a current interest rate. The estimated down-payment amount can be obtained from a personal profile of the individual. For example, the individual can indicate in the personal profile that the individual can provide a specific percentage of a purchase price for the down-payment or a specific dollar amount for the down-payment.

Other information can be displayed on the display device of the AV, including news regarding the neighborhood in which the first house is located, information regarding schools, parks, shopping, transportation, noise and neighborhood safety. The other information can also include photos of the interior and exterior of the first house.

When the display device is a window of the AV, the information can be projected as an overlay on the window, so that the individual can simultaneously view a scene from the window and also view the projected information. Augmented reality tags can be used to display in the information on the window. The augmented reality tags can be used to project a specific item of information at a specific location on the window.

When the AV arrives at the first house, the individual can get out of the AV and explore the first house. The individual can use a mobile device such as a tablet computer or smartphone to create notes and ratings regarding aspects of the first house. The notes and ratings can be sent to the server computer and used to dynamically modify the trip itinerary, as discussed in more detail later herein.

In one example implementation, the individual can communicate with the professional service agent during the house hunting day trip. The communication can be via a direct connection with the professional service agent or the communication can be via a virtual connection. For example, during the house hunting day trip, the virtual professional service agent, for example a virtual banker, a virtual realtor or a virtual mortgage company employee can be displayed on a smartphone or tablet computer of the individual or on a display device in the AV. The virtual professional service agent can provide information to the individual regarding the houses that the individual visits during the trip. In an example implementation, the information can be provided as a narrative from the virtual professional service agent during the house hunting day trip.

The virtual professional service agent can also receive feedback from the individual and dynamically modify the itinerary based on the feedback or have a server computer dynamically modify the itinerary based on the feedback. For example, based on the feedback, the itinerary can be modified to include more or less expense houses, houses in a different neighborhood or houses that include different features. For example the itinerary can be modified to include more bedrooms, include or exclude a swimming pool, include homes with hardwood floors, etc.

In this disclosure, the individual is a customer of an organization that can arrange a house hunting trip for the individual using an AV. In an example implementation, the organization can be a realty company that can maintain a profile of the individual, that can obtain personal information regarding the user from a third party organization, such as a financial institution where the individual can have one or more financial accounts and that provide an AV to the user during the trip. For example, the realty company can maintain one or more AVs that can be customized to include a display screen and that have the display screen incorporated into one or more windows of the AV. In another example implementation, the organization can be a ride sharing company that includes customized AVs and that has a business relationship with the realty company and the financial institution. In still another example implementation, the organization can be the financial institution; the financial institution can have a business relationship with the realty company and a third party company that can provide customized AVs. Implementations using other types of organizations are possible.

The systems and methods disclosed herein are directed to a computer technology that can automatically create a trip itinerary for a house hunting day trip for an individual using an AV. In addition, the computer technology can automatically generate an optimal route for an AV that can pick up the individual at an airport and efficiently drive the individual to each house and point of interest on the trip itinerary. The computer technology can also provide financing and other information to the user regarding the houses on the list of houses and information regarding the neighborhood in which the houses are located.

The information can also be displayed on one or more windows of the AV, permitting the individual to view the neighborhood through the window at the same time as information regarding the houses and the neighborhood are projected on a window of the AV. Additional details regarding the use of the windows of the AV to provide augmented information is described in U.S. patent application Ser. No. 15/621,379, filed on even date herewith, the entirety of which is incorporated by reference. In addition, the computer technology can also dynamically update the trip itinerary during the house hunting day trip based on feedback from the individual. The computer technology also permits a virtual digital assistant to provide a narrative during the day trip, answer any questions from the individual and process the feedback from the individual.

FIG. 1 shows an example system 100 that can support house hunting in an AV. System 100 includes a customer computing device 102, a network 104, an autonomous vehicle 106, an organization server computer 108, a database 112 and third party computer systems 114. Organization server computer 108 includes a house search itinerary engine 110. More, fewer or different components can be used.

The example customer computing device 102 is an electronic computing device of a user who is a customer of an organization associated with organization server computer 108. The electronic computing device can be a desktop computer, a laptop computer, a smartphone or a tablet computer. The customer can use the electronic computing device to provide a customer profile and information regarding housing preferences to organization server computer 108. More than one customer computing device 102 can be used.

The example network 104 is a computer network such as the Internet. Customer computing device 102 can wirelessly connect to or otherwise access organization server computer 108 via network 104.

The example autonomous vehicle 106 is a self-driving vehicle that can be used by the customer. Autonomous vehicle 106 includes electronics that permits communication between autonomous vehicle 106 and organization server computer 108 over network 104. The electronics can direct the AV to houses and points of interest on the optimal route based on commands received from organization server computer 108 and based on a customer selection of a house or a point of interest on a touch screen display device in the AV.

The example organization server computer 108 is a server computer of an organization that can arrange a house hunting day trip for the customer using the AV. For example, the organization can be a realty company that can arrange the house hunting day trip and that can provide the AV and the trip itinerary to the customer. Other types of organizations are possible.

The example house search itinerary engine 110 can identify houses that the customer may be interested in purchasing. The house search itinerary engine 110 can also use profile other personal information regarding the user to identify houses in which the customer may be interested to view during the day trip and to prequalify the customer to purchase one or more of the identified houses. The house search itinerary engine 110 can also identify an optimized route for the AV from a current location of the customer to each of the identified houses and points of interest on the trip itinerary.

Other functionality for the house search itinerary engine 110 can include providing supplemental information regarding the identified houses, interfacing with a display screen on the AV and operating the AV. The supplemental information can include items regarding a house and a neighborhood in which the house resides and financial information regarding the house and purchasing the house. Example supplemental information regarding the house can include items such as a noise level in a neighborhood where a house is located, a safety assessment of the neighborhood, including an assessment of crime and an assessment of potentially dangerous close-by utilities such as pipelines, prices of other houses in the neighborhood, future growth rate and plans for the neighborhood, and other information. Example supplemental information regarding purchasing the home can include such items as an asking price of the house and estimated monthly mortgage payments for the house. The house search itinerary engine 110 is described in more detail later herein.

The example database 112 is a database associated with the organization. Profile information for the customer can be stored in database 112. In addition, if the organization is a financial institution, financial and personal information for the customer can also be stored in database 112. In addition, if the organization is a realty company, database 112 can include information regarding current houses for sale. Database 112 can be distributed over a plurality of databases. For example, one database 112 can store the financial and personal information for the customer and another database 112 can include information regarding current houses for sale. The house search itinerary engine 110 can be programmed to query (e.g. using SQL) database 112 to obtain profile information and route information for a best fit of homes to search for the customer and to create the optimal travel route to those homes. Various profile information, house information and route information can be stored in and retrieved from database 112.

The example third party computer systems 114 are computer systems of third party organizations that can provide personal information about the customer to organization server computer 108. An example third party computer system 114 is a server computer of a financial institution, such as a bank, at which the user can have one or more financial accounts. The financial institution can include a profile of the user that can include such items as name, age, address, employer, employer's address, spouse, names and ages of children, job title, current salary and other information related to house hunting using the AV. Other personal information can be provided by one or more of the third party computer systems 114, for example one or more social media websites.

There can be various technical advantages associated with the systems and methods described herein. For example, organization server computer 108 can be optimized using the house search itinerary engine 110 to create an optimized list of houses for the customer to view. Organization server computer 108 can also be optimized to create an optimal route using the AV from a current location of the customer to each of the houses on the optimized list of houses and to reach points of interest associated with one or more of the houses on the optimized list of houses. This allows the house search itinerary engine 110 to perform more efficiently to handle many house search requests with less computing power and in a shorter amount of time. This can result in an overall system that is faster, uses less computing power and is able to handle an increased number of house search requests.

Figure 2:
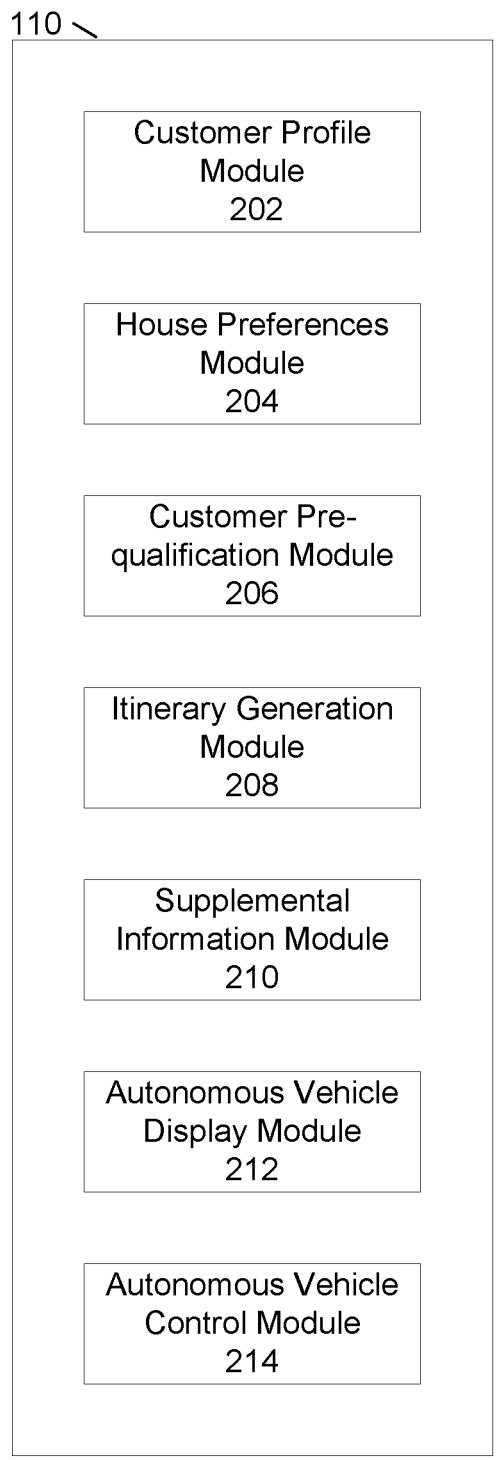
FIG. 2 show example modules of the house search itinerary engine of FIG. 1.

FIG. 2 shows example modules of the house search itinerary engine 110. The example house search itinerary engine 110 includes a customer profile module 202, a house preferences module 204, a customer prequalification module 206, an itinerary generation module 208, a supplemental information module 210, an autonomous vehicle display module 212 and an autonomous vehicle control module 214. More, fewer or different modules are possible.

The example customer profile module 202 stores information for profile information for the customer regarding house hunting. Example profile information can include personal information such as the names and ages of the customer and the customer's family members, the customer's employer and current salary, the employer and current salary of the spouse of the customer and other personal information. Other customer profile information is possible.

The example house preferences module 204 stores customer preferences regarding houses to purchase. Example preferences can include a preferred style of house, a required number of rooms, preferred features of a house, a price range, a preferred city and a preferred neighborhood. Example preferred features can include a finished basement, an unfinished basement, a swimming pool, a sauna, a sun room, granite countertops, a kitchen island, large closets, a large backyard, a fireplace, hardwood floors and other features.

The example customer prequalification module 206 can access the customer profile module 202 and one or more third party computer systems 114 to obtain personal and financial information regarding the customer. The customer prequalification module 206 can use the personal and financial information regarding the customer to prequalify the customer to purchase houses identified by the house identification module 204. The prequalified houses can be identified on a listing of available houses than can be displayed on the electronic computing device of the customer or on a display screen in the AV.

The example itinerary generation module 208 can determine an optimal route from a current location of the AV to each of the houses and points of interest on the itinerary. The optimal route can be a route that provides a shortest distance, a shortest time or most efficient route to the houses and points of interest identified for viewing.

The customer can select houses and points of interest for viewing from the electronic computing device of the customer (for example a smartphone or tablet computer) or from a display screen in the AV. In an example implementation, the AV can be directed from a current location of the customer (for example the airport where the customer is picked up) to a first house on the itinerary. The customer can view the first house, both by touring the first house and via features, costs and photos of the first house that can be viewed on the display screen in the AV. The customer can then decide whether to proceed to a next house on the itinerary, a point of interest on the itinerary or the customer can decide that a new itinerary is needed.

For example, if the customer decides that the customer wants to view a different type of house, for example a house in a different price range, with different features or in a different neighborhood than houses currently on the itinerary, the customer can provide feedback to that effect to organization server computer 208. The itinerary generation module 208 can then dynamically generate a revised itinerary with houses and points of interest that are consistent with the feedback provided. The itinerary generation module 208 can also generate a new optimal route from the current location of the user to a first house on the revised itinerary.

The current location of the customer can be a current geolocation for the customer that can be obtained from global positioning system (GPS) software on the electronic computing device of the customer. The current location of the AV can be a current geolocation of the AV that can be obtained from GPS software on an electronic computing device in the AV.

The example supplemental information module 210 can be used to obtain supplemental information regarding the houses identified for viewing by the customer and regarding houses along the optimal route to the houses identified for viewing by the customer. The supplemental information can be obtained from one or more of the third party computer systems 114 and can include such items as prices of houses near the first house on the optimal route, information regarding the neighborhood in which the first house is located, information regarding schools, crime, parks, transportation, noise levels and other information regarding the first house on the optimal route.

The supplemental information can also include financial information about the houses on the itinerary including a current asking price for each house and estimated mortgage payments for a house that the customer plans to view. Other supplemental information is possible. In addition, some of the supplemental information can be obtained by the AV. For example, the AV can gather noise levels of the neighborhood in which a house is located, and for an area around the house, as the AV drives through the neighborhood.

The example autonomous vehicle display module 212 controls a display device in the AV and can provide information such as a listing of houses for the customer to view and an optimal route to the houses on the display device. The listing of houses can also include an icon or another type of marker that can identify the houses on the listing of houses that the user is prequalified to purchase. The display device can be a display screen that is built into the AV. In some implementations, the display device can be implemented on one or more windows of the AV, including the windshield of the AV. The display screen can be a touch screen, permitting the user to select items on the display. In addition, when the display screen is implemented on the one or more windows of the AV, the customer can use hand motions to scroll a listing of the houses up or down on the one or more windows.

The example autonomous vehicle control module 214 can control the operation of the AV. When a customer decides to go house hunting using an AV, the customer can request the AV from the organization that organized the house hunting. The request can include a current geolocation of the customer. The autonomous vehicle control module 214 can then direct the AV to the current geolocation of the customer, pick up the customer and direct the AV to the first house on the optimal route. When the AV arrives at a geolocation of the first house on the optimal route, the customer can get out of the AV and investigate the first house. When the customer returns to the AV, the customer can use a command to resume the AV on the optimal route. The autonomous vehicle control module 214 can then direct the AV to a second house on the optimal route. This process can continue for all houses on the optimal route. The autonomous vehicle control module 214 can then return the customer to a drop off location, for example the airport at which the customer arrived. The command used by the customer can be a voice command or a command initiated by touching an area on the display screen in the AV.

Figure 3:
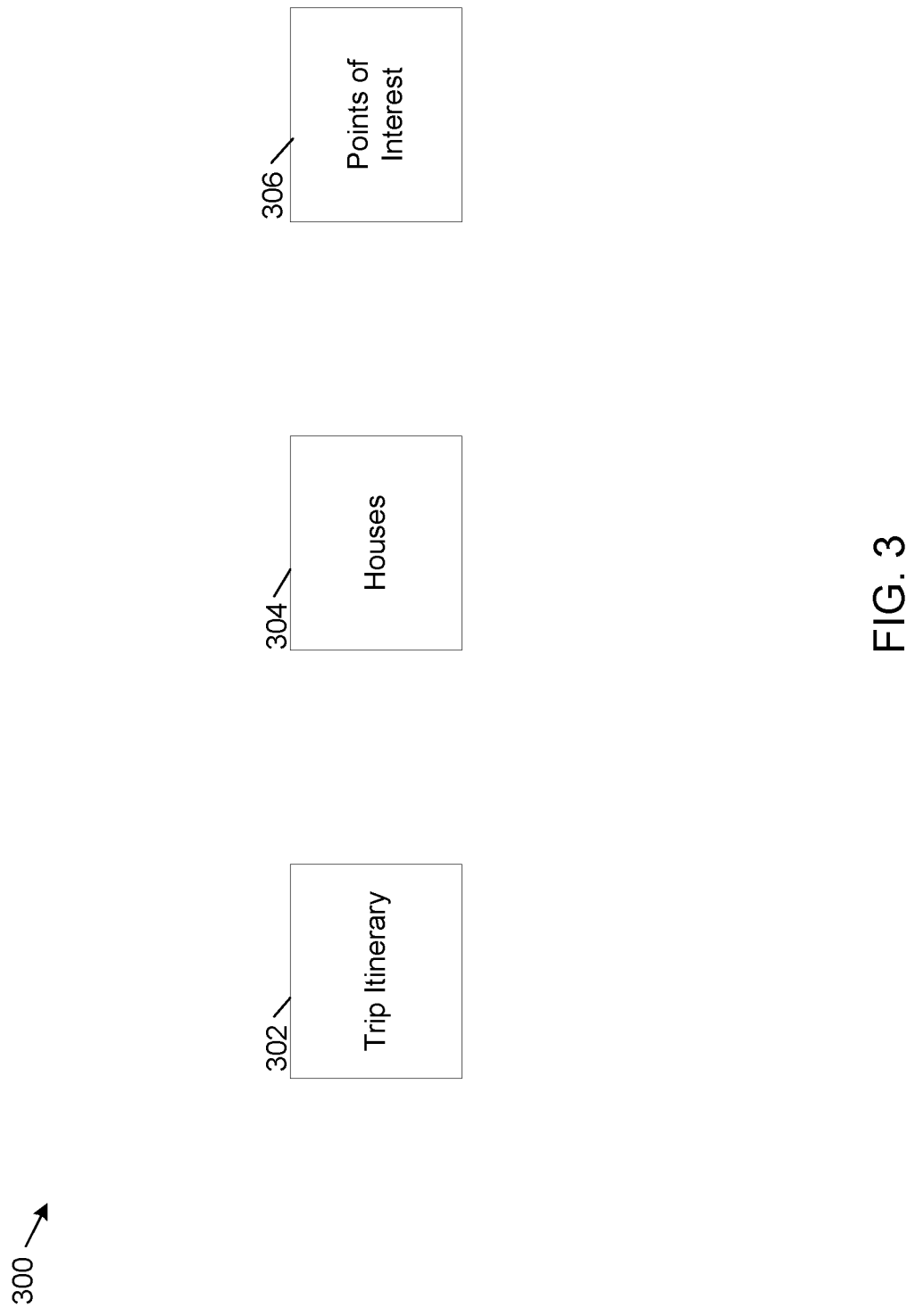
FIG. 3 shows an example user interface that can be displayed in the autonomous vehicle of FIG. 1.

FIG. 3 shows an example user interface 300 that can be displayed on the display device in the AV or on a smartphone or tablet computer. The user interface 300 can be displayed on the smartphone or tablet computer when an itinerary for a house hunting day trip has been prepared for a customer and can be displayed on the display device in the AV as well as on the smartphone or tablet computer when the customer is in the AV during the house hunting day trip.

User interface 300 includes three command boxes that can be selected by the customer. The command boxes include a trip itinerary 302 command box, a houses 304 command box and a points of interest 306 command box. More, fewer, or different command boxes can be used.

When the customer selects the example trip itinerary 302 command box, an itinerary for the house hunting trip can be displayed. The itinerary can show a listing of the houses, points of interest and other activities that have been arranged for the customer and an approximate time for each. The user can drill down and select a specific house, points of interest or activities to display additional information regarding the house, point of interest or activity. For example, selection of a specific house a display of another user interface for the house, point of interest or activity that can provide the customer with additional information regarding the house, point of interest or activity.

When the customer selects the example houses 304 command box, a list of houses for sale in a geographical area of the house hunting day trip can be displayed. The list of houses can include houses that are already included in the trip itinerary, but can also include additional houses for which the customer may have interest. For example the additional houses for which the customer may have interest can include houses that are in a higher or lower price range than the customer prefers or can include houses having different features than the customer prefers. The customer can drill down and display additional information regarding a house by selecting the house in the list of houses.

When the customer selects the example points of interest 306 command box, a list of points of interest in the geographical area of the house hunting day trip can be displayed. The points of interest can include such places as schools, parks, churches, shopping areas, downtown areas and local landmarks. Some of the points of interest can already be included on the trip itinerary. The customer can drill down and display additional information regarding a point of interest by selecting the point of interest in the list of points of interest.

FIG. 4 shows an example trip itinerary 400. The example trip itinerary 400 can be displayed when the customer selects the trip itinerary 302 command box. The example trip itinerary indicates planned activities for the house hunting day trip and an estimated time for each activity. For example, the customer is picked up at the airport by a AV at 10:00, views a first house at 10:30, views a second house at 11:15, meets with a realtor at 12:00, has lunch at 12:30, views a local elementary school at 1:30, views a local high school at 2:00, views parks, churches and shopping areas at 2:30, views a third house at 3:15, views a fourth house at 4:00 and returns to the airport in the AV at 5:30.

Organization server computer 108 can dynamically change the itinerary 400 at any time during the day based on feedback from the customer. For example, after viewing the first two houses and meeting with the realtor, the customer can decide to view houses in a different price range or to view houses that have a swimming pool or an unfinished basement. The customer or the realtor can provide this feedback to organization server computer 108 and organization server computer can revise the trip itinerary and provide an updated itinerary. For example, houses 3 and 4 to be viewed in the afternoon can be changed to include houses that have the added features or price range that the customer suggested.

Figure 5:
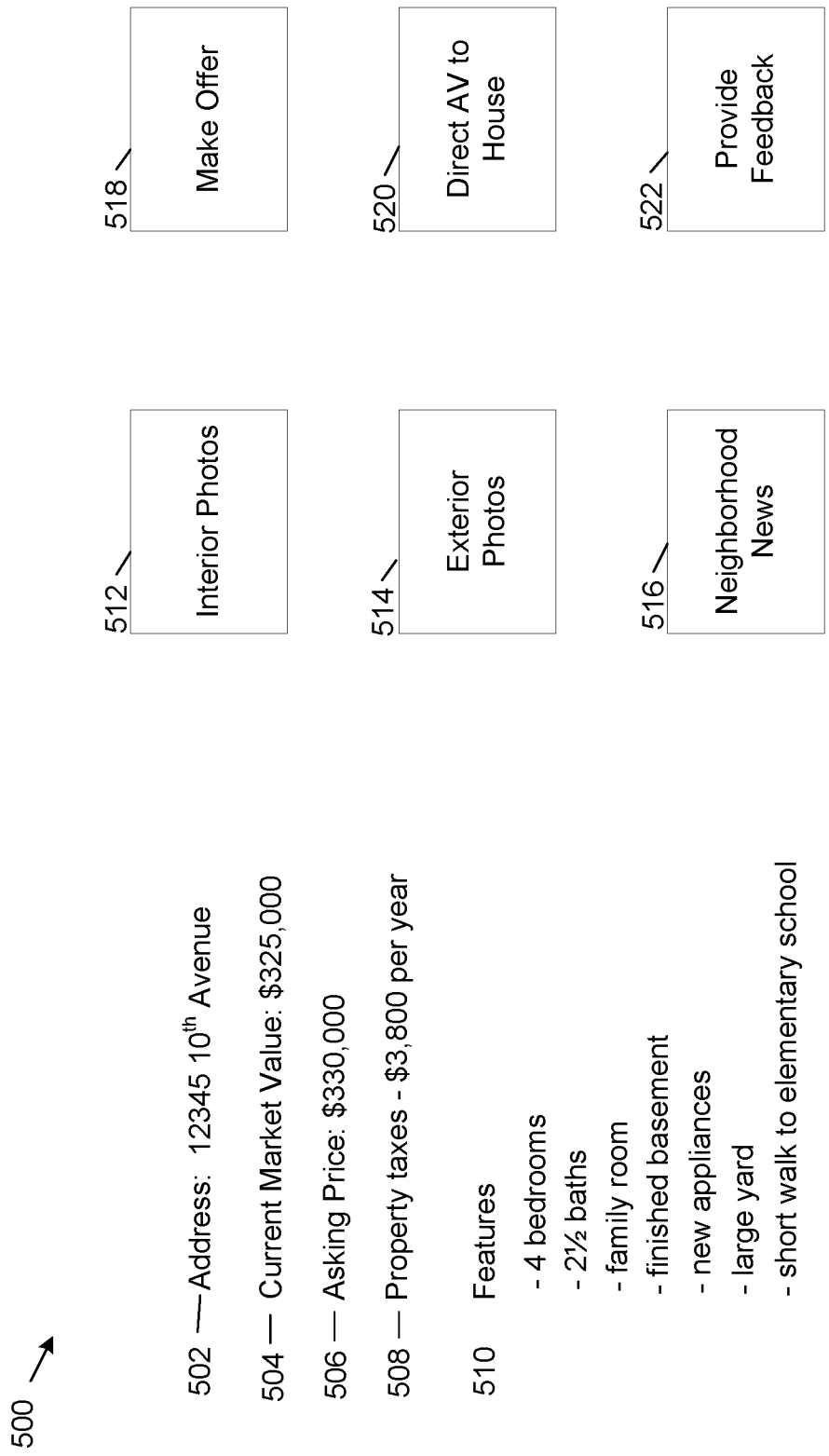
FIG. 5 shows an example user interface for a selected house.

FIG. 5 shows an example user interface 500 for a selected house. The user interface 500 can be displayed when the customer activates the houses 304 command box and selects the specific house or the user interface 500 can be activated when the customer selects a specific house from the trip itinerary, for example by selecting customer views house 1.

The example user interface 500 includes an address 502, a current market value 504, an asking price 506, current property taxes 508 and features 510 of the selected house. For example, the current market value is $325,000, the asking price is $330,000, the property taxes are $3,000 and the house includes 4 bedrooms, 2 baths, a family room, a finished basement, new appliances, a large yard and the house located a short walk from an elementary school.

The example user interface 500 also includes six example command boxes 512, 514, 516, 518, 520 and 522. More or fewer command boxes can be used. When command box 512 is selected, interior photos of the selected house are displayed. When command box 514 is selected, exterior photos of the selected house are displayed. When command box 516 is selected, neighborhood news for the neighborhood in which the selected house is located is displayed. The neighborhood news can include information such as any crimes reported in the neighborhood, any recent storms that may have caused damage in the neighborhood and any other news worthy events regarding the neighborhood. When command box 518 is selected, the customer can make an offer to purchase the selected house. When command box 520 is selected, the AV can be directed to drive to the selected house. When command box 522 is selected, the customer can provide feedback on the selected house. The feedback can comprise both a general comment regarding the first house and a request for changes in features, price range or neighborhood, etc. in future homes to visit.

Figure 6:
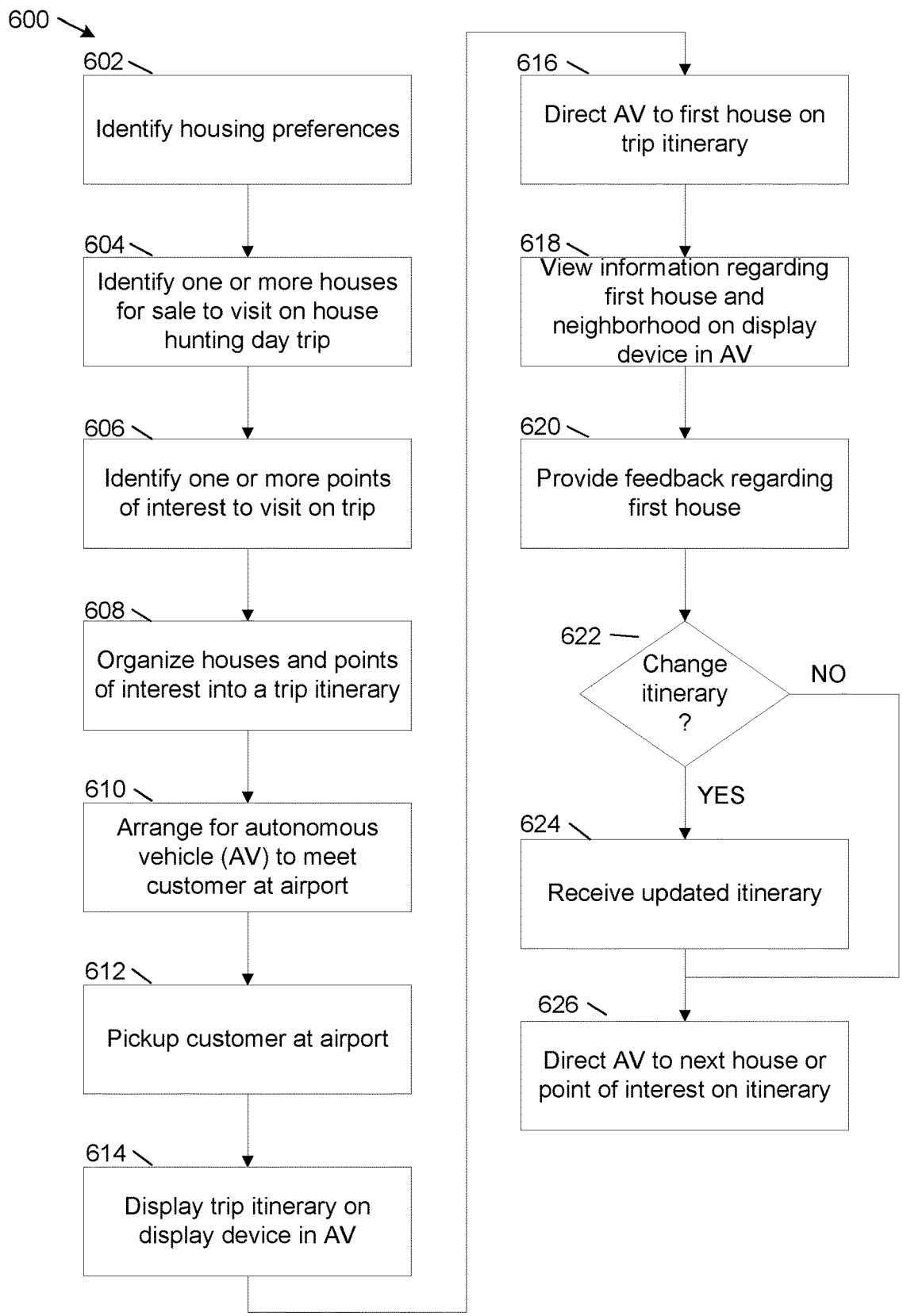
FIG. 6 shows an example method for implementing a house hunting day trip using an autonomous vehicle.

FIG. 6 shows a flowchart for an example method 600 for implementing a house hunting day trip using an AV for an individual who is a customer of an organization such as a realty company that can organize the house hunting day trip for the customer.

At operation 602, the customer identifies preferences for houses that the customer may be interested in purchasing. The preferences can include such items as style of house, price range and neighborhood. The customer can provide the preferences to a professional service agent who can help organize the house hunting day trip. The professional service agent can be a realtor who is a representative of the realty company. The professional services agent can also be a legal representative or a financial services agent that has a relationship with the realty company or with another organization can is organizing the house hunting day trip.

At operation 604, the professional service agent can identify one or more houses for sale that the customer can visit during the house hunting day trip. The professional service agent can also work with a third party (such as a realtor if the professional service agent is not a realtor) to identify the one or more houses. The selection of the one or more houses can be based the identified customer preferences.

At operation 606, one or more points of interest can be identified to visit on the trip. The points of interest can be based on the customer preferences and the geographical area in which the one or more identified houses are located. The points of interest can include such sites as schools, shopping areas, parks and local tourist attractions.

At operation 608, the identified houses and points of interest are organized into an itinerary for the house hunting day trip. The itinerary can be created using a software application on a server computer of the organization that is organizing the house hunting day trip, for example organization server computer 108. The server computer can access one or databases, for example database 112, and one or more third party computer systems 114 to obtain information regarding the identified house and points of interest. The server computer can also create an optimized route for the itinerary so that the customer can be picked up via the AV and visit the identified houses and points of interest in an optimal manner.

At operation 610, the organization arranges for the AV to meet the customer at the local airport. When the organization is a realty company, the realty company may own or lease one or more AVs that can be used for the house hunting trip. When the organization does not own or lease an AV, the organization can rent the AV from a third party source such as a car rental company or a ride sharing service. In situations where the AV uses a third party source, the organization typically has an arrangement with the third party source and can specify features needed in the AV, such as the display device and optionally the ability to project images on a window of the AV.

At operation 612, the AV is directed to the airport and picks up the customer at the airport.

At operation 614, the customer can display the trip itinerary on the display device in the AV. The display device can mounted at an accessible place for the customer to view in the AV. The specific place where the AV is mounted is dependent on the configuration of the AV. For example, some AV configurations can include a table on which the display device can be mounted and swivel so that multiple passengers in the AV can view the display device.

At operation 616, the customer can direct the AV to travel to a first house on the trip itinerary. The customer can select the first house on the trip itinerary, for example by touching a listing of the first house and selecting a command button to direct the AV to the first house. Alternatively, the customer can use a voice command to direct the AV to the first house.

At operation 618, the customer can view information about the first house on the display screen of the AV. For example, information similar to that displayed in FIG. 5 can be viewed.

At operation 620, the customer provides feedback regarding the first house. The customer can provide feedback using the display device or the customer can provide feedback via a personal device, such as a smartphone. The feedback can be general in nature, such as that the customer liked or did not like the first house or the feedback can be more specific, such as the customer can request to view a house with different features, in a different price range or in a different neighborhood.

At operation 622, a determination is made as to whether there should be a change in the trip itinerary based on the customer's feedback. For example, if the customer indicates that the customer wants to view houses in a different price range or with different features, the trip itinerary can be changed so that houses to be viewed during the house hunting day trip are of the price range or have the features indicated by the customer.

At operation 622, when a determination is made that the trip itinerary needs to be changed, organization server computer 108 identifies one or more houses that meet the customer's criteria, generates an updated trip itinerary and sends the updated trip itinerary to the AV. The updated trip itinerary is then displayed on the AV display device.

At operation 624, the AV is then directed to the next house on the updated trip itinerary.

At operation 622, when a determination is made that the customer is satisfied with the houses viewed thus far on the house hunting house trip and the trip itinerary does not need to be changed, the AV is directed to the next house on the original trip itinerary. For the example implementation of method 600, the customer uses a voice command to direct the AV to the next house. In other implementations, the customer can select the next house from the trip itinerary and then select a command button, for example direct AV to house 520 command button, to direct the AV to the next house.

Figure 7:
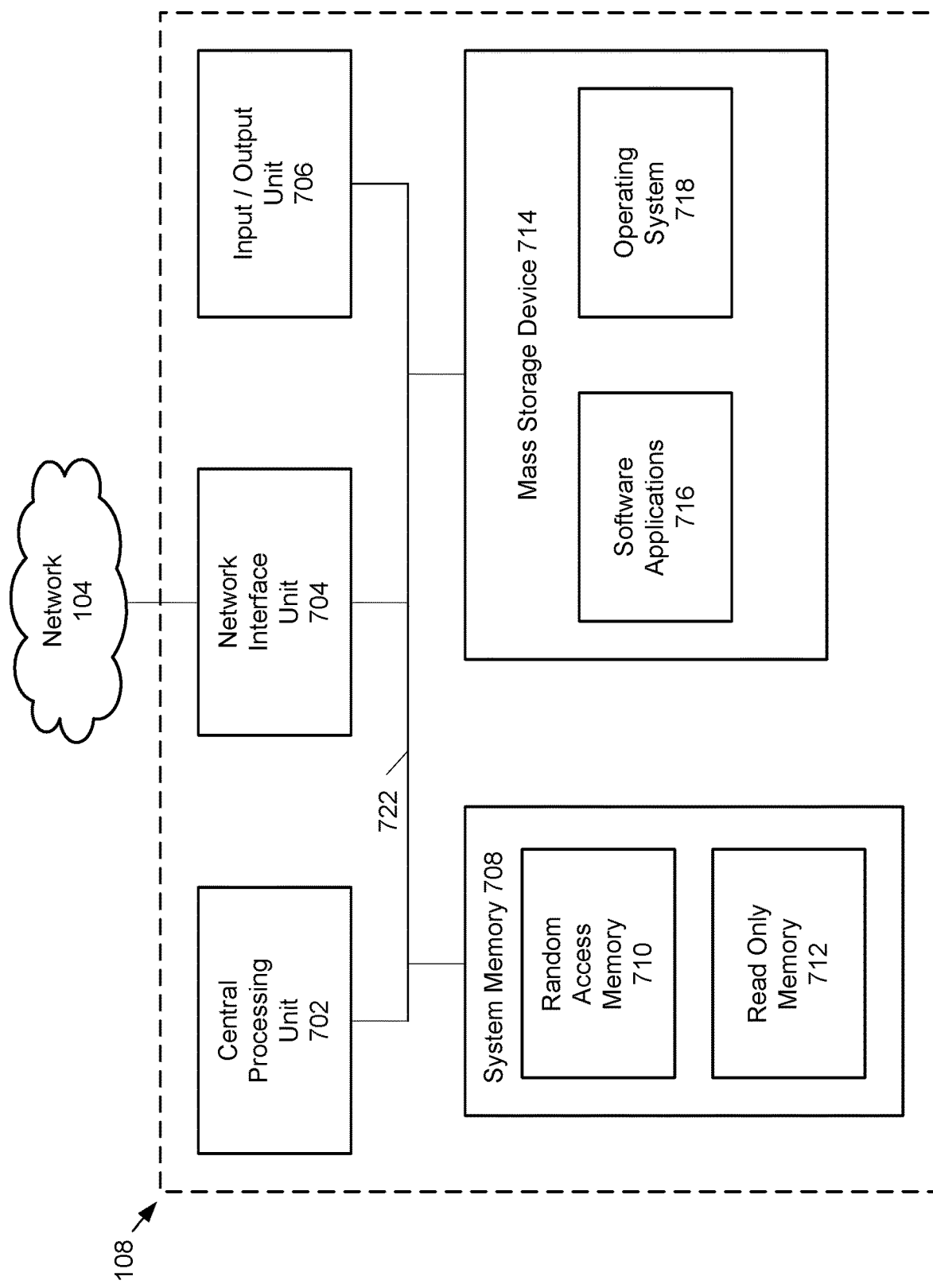
FIG. 7 shows example physical components of the organization server computer of FIG. 1.

As illustrated in the example of FIG. 7, organization server computer 108 includes at least one central processing unit ("CPU") 702, also referred to as a processor, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the organization server computer 108, such as during startup, is stored in the ROM 712. The organization server computer 108 further includes a mass storage device 714. The mass storage device 714 is able to store software instructions and data. Some or all of the components of the organization server computer 108 can also be included in customer computing device 102.

The mass storage device 714 is connected to the CPU 702 through a mass storage controller (not shown) connected to the system bus 722. The mass storage device 714 and its associated computer-readable data storage media provide non-volatile, non-transitory storage for the organization server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computer 108.

According to various embodiments of the invention, the organization server computer 108 may operate in a networked environment using logical connections to remote network devices through the network 104, such as a wireless network, the Internet, or another type of network. The organization server computer 108 may connect to the network 104 through a network interface unit 704 connected to the system bus 722. It should be appreciated that the network interface unit 704 may also be utilized to connect to other types of networks and remote computing systems. The organization server computer 108 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the organization server computer 108 can store software instructions and data. The software instructions include an operating system 718 suitable for controlling the operation of the organization server computer 108. The mass storage device 714 and/or the RAM 710 also store software instructions and software applications 716, that when executed by the CPU 702, cause the organization server computer 108 to provide the functionality of the organization server computer 108 discussed in this document. For example, the mass storage device 714 and/or the RAM 710 can store software instructions that, when executed by the CPU 702, cause the organization server computer 108 to display received data on the display screen of the organization server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented in an autonomous vehicle (AV) for facilitating property hunting trip using the AV, the method comprising:
a server in communication with the AV;
the server receiving an itinerary based on first information provided by one or more property hunters, the itinerary including a list of one or more properties and their corresponding geolocation;
the server transmitting the itinerary to the AV;

the AV receiving, in response to receiving the itinerary, a first command to direct the AV to a geolocation of the one or more property hunters for pickup;

after the one or more property hunters enters the AV, receiving a second command to direct the AV to a geolocation of a first property based on the first information provided in the itinerary;

displaying second information associated with itinerary and/or first information provided in the itinerary on a window of the AV and having the one or more property hunters to interact with the displayed second information and/or itinerary;

after the one or more property hunters have arrived at the geolocation of the first property, receiving feedback from the one or more property hunters regarding the first property, wherein the feedback includes at least one of:

removing at least one or more different properties from the list of properties provided in the itinerary;

adding at least one or more different properties to the list of properties provided in the itinerary;

adding at least one or more points of interest to the itinerary;

rearranging the sequence of properties and/or points of interests, if any additional properties and/or points of interests exist after the one or more property hunters have visited a property from the list of properties provided in the itinerary, in order to instruct the AV as to where to drive to next;

providing additional information regarding the first property and/or comparable properties on the window of the AV; or a combination thereof;

adjusting the itinerary in response to receiving the feedback;

in response to receiving the feedback to the itinerary, receiving a third command to direct the AV to the next geolocation provided in the itinerary, if additional geolocations exist; and upon completing the list and in response to receiving no additional feedback, receiving a fourth command to direct the AV to drop-off the one or more property hunters at a geolocation.

2. The method of claim 1, wherein the at least one different property comprises a property that includes one or more features not found in at least one of the other properties provided in the itinerary.

3. The method of claim 1, wherein the at least one different property has a different price range than at least one of the other properties provided in the itinerary.

4. The method of claim 1, wherein the at least one different property is in a different neighborhood than at least one of the other properties provided in the itinerary.

5. The method of claim 1, wherein the itinerary includes an optimal route from the geolocation of the one or more property hunters to the one or more properties on the itinerary and to the one or more points of interest on the itinerary.

6. The method of claim 1, wherein, as the AV travels to the geolocation destination of a property in the list of properties provided in the itinerary, projecting prices of properties along a route to the destination property on the window of the AV.

7. The method of claim 1, wherein, when the AV reaches the geolocation destination of a property in the list of properties provided in the itinerary, projecting estimated mortgage payments for the destination property on the window of the AV.

8. The method of claim 1, further comprising: identifying a service agent to facilitate the property hunting trip, the service agent being one of a realtor, a legal advisor or financial service agent; and receiving at least one communication from a virtual service agent during the property hunting trip via the AV.

9. The method of claim 8, further comprising receiving a narrative from the virtual service agent during the property hunting trip, the narrative providing commentary regarding one or more of the properties and points of interest in the itinerary and regarding neighborhoods visited during the property hunting trip.

10. The method of claim 1, further comprising: receiving prequalification for a mortgage for at least one at least one or more property in the itinerary; and identifying the at least one or more property that are prequalified on a display device of the AV.

11. A method implemented in an autonomous vehicle (AV) for facilitating property hunting using the AV, the method comprising:

directing the AV to a geolocation of an individual;

receiving an itinerary for a property hunting trip for the individual;

displaying the itinerary on a window of the AV;

after the individual enters the AV, receiving a command to direct the AV to a geolocation of a first property on the itinerary;

based on the change in preferences, displaying an updated itinerary on the window of the AV;

a server in communication with the AV;

the server receiving an itinerary based on first information provided by one or more property hunters, the itinerary including a list of one or more properties and their corresponding geolocation;

the server transmitting the itinerary to the AV;

the AV receiving, in response to receiving the itinerary, a first command to direct the AV to a geolocation of the one or more property hunters for pickup;

after the one or more property hunters enters the AV, receiving a second command to direct the AV to a geolocation of a first property based on the first information provided in the itinerary;

displaying second information associated with itinerary and/or first information provided in the itinerary on a window of the AV and having the one or more property hunters to interact with the displayed second information and/or itinerary;

after the one or more property hunters have arrived at the geolocation of the first property, receiving an indication of a change in preferences regarding properties to be viewed during the property hunting trip;

based on the change in preferences, displaying an updated itinerary on the window of the AV;

receiving a third command to direct the AV to the next geolocation provided in the itinerary, if additional geolocations exist; and upon completing the list and in response to receiving no additional change in preferences, receiving a fourth command to direct the AV to drop-off the one or more property hunters at a geolocation.

12. The method of claim 11, further comprising:

selecting a property from the list of properties in the itinerary;

obtaining an asking price for selected property listed in the itinerary;

obtaining a down-payment amount the one or more property hunters is willing to pay for the selected property;

based on the asking price and the down-payment amount, obtaining an amount of a monthly mortgage payment for the property hunter for the selected property; and displaying the amount of the monthly mortgage payment, on the window of the AV, financial information regarding the selected property.

13. The method of claim 12, further comprising directing the AV to at least one point of interest related to a neighborhood of the selected property or of another property in the itinerary.

14. The method of claim 13, further comprising directing the AV to one or more schools in the neighborhood of the selected property or of another property in the itinerary.

15. The method of claim 11, wherein the updated itinerary includes at least one property in a different price range than the selected property.

16. The method of claim 11, wherein the updated itinerary includes at least one property having features not included in any of the properties included in the itinerary received for the property hunting trip.

17. The method of claim 11, further comprising receiving a narrative from a virtual professional service agent during the property hunting trip, the narrative describing one or more properties in the itinerary.

18. An electronic computing device implemented in an autonomous vehicle (AV) comprising:

a processor; and system memory, the system memory including instructions which, when executed by the processor, cause the electronic computing device to:

receive an itinerary for a property hunting trip from a server computer;

the AV receive, in response to receiving the itinerary, a first command to direct the AV to a geolocation of the one or more property hunters for pickup;

after the one or more property hunters enters the AV, receive a second command to direct the AV to a geolocation of a first property based on the first information provided in the itinerary;

display second information associated with itinerary and/or first information provided in the itinerary on a window of the AV and having the one or more property hunters to interact with the displayed second information and/or itinerary;

receive feedback from the one or more property hunters regarding the first property;

transmit the one or more feedback to the server computer;

based on the one or more feedback, receive from the server computer an updated itinerary for the property hunting trip;

display the updated itinerary on the window of the AV;

in response to receiving the updated itinerary, receive a third command to direct the AV to the next geolocation provided in the itinerary, if additional geolocations exist; and upon completing the list and in response to receiving no additional feedback, receive a fourth command to direct the AV to drop-off the one or more property hunters at a geolocation.

19. The electronic computing device implemented in an autonomous vehicle (AV) of claim 18, wherein the second information comprises displaying on the window of the AV financial information regarding the first property, the financial information including an asking price for the first property, current property taxes for the first property and an estimated monthly mortgage payment for the one or more property hunters for the first property.

20. The electronic computing device implemented in an autonomous vehicle (AV) of claim 18, wherein receiving the updated itinerary from the server computer comprises including at least one property in a different price range than the first property or at least one property in a different neighborhood than the first property.

* * * * *

UNITED STATES PATENT AND TRADEMARK OFFICE
CERTIFICATE OF CORRECTION

PATENT NO. : 10,803,536 B1
APPLICATION NO. : 15/621318
DATED : October 13, 2020
INVENTOR(S) : Bachia et al.

Page 1 of 1

It is certified that error appears in the above-identified patent and that said Letters Patent is hereby corrected as shown below:

In the Specification

Column 9, Line 43: delete "2" and insert --2 ½--

In the Claims

Column 14, Line 18, Claim 12: delete "at least one at least one" and insert --at least one--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*